United States Patent Office 3,393,979
Patented July 23, 1968

3,393,979
CATALYTIC PRODUCTION OF MIXTURES OF CARBON DIOXIDE AND HYDROGEN FROM AQUEOUS METHANOL
Peter Desmond Holmes and Alan Richard Thornhill, Sunbury-on-Thames, Middlesex, England, assignors to The British Petroleum Company Limited, London, England, a corporation of England
No Drawing. Filed May 13, 1964, Ser. No. 367,242
Claims priority, application Great Britain, May 22, 1963, 20,375/63
4 Claims. (Cl. 23—212)

ABSTRACT OF THE DISCLOSURE

A process for the production of mixtures of carbon dioxide and hydrogen in which methanol and water are passed over a zinc-chromium catalyst which may include copper, and in which a mixture consisting of or containing hydrogen and carbon dioxide is recovered as a product.

---

This invention relates to a process for the production of mixtures comprising carbon dioxide and hydrogen.

According to the present invention there is provided a process which comprises passing methanol and water at elevated temperature over a catalyst formed by reacting zinc oxide with chromic acid, said chromic acid if desired containing copper ions, and recovering a mixture consisting of or containing hydrogen and carbon dioxide.

Preferably copper metal or a copper compound is dissolved in chromic acid. If desired sufficient copper or copper compound may be employed to ensure that some copper or copper compound is present as a suspension in the chromic acid. The chromic acid may be employed in anhydrous or hydrated state or in aqueous solution. Suitably the chromic acid is formed by dissolving chromium trioxide in water.

Suitable copper compounds include copper sulphate, nitrate, carbonate, oxide and hydroxide.

The chromic acid (with or without copper ions dissolved therein and with or without copper or a copper compound in suspension) is preferably slurried with zinc oxide and the mixture dried, for example at 110° C. The mixture is preferably calcined at 150° to 500° C., for example 250° C., in air.

Preferably the powder is employed at high bulk density and preferably, the powder is pelleted.

Preferably the conversion of methanol and water to carbon dioxide and hydrogen is carried out at a temperature in the range 150° to 400° C. and more particularly in the range 180° to 350° C.

While the decomposition of methanol to form carbon monoxide and hydrogen is endothermic, the ensuing shift reaction between carbon monoxide and water is exothermic; overall the two reactions require input of heat. The product may contain a minor proportion of carbon monoxide formed in the first reaction stage.

Pressure may be sub-atmospheric, atmospheric or super-atmospheric.

Suitably the mole ratio of methanol to water lies in the range 1:1 to 1:4. The proportion of carbon monoxide (when present in the product) can be decreased by decreasing said mole ratio.

The liquid space velocity of methanol will preferably be in the range 0.5 to 2.0 vol./vol./hr., more particularly 0.5 to 1.0 vol./vol./hr.

Preferably the catalyst contains zinc and copper in an atomic ratio in the range 100:1 to 2:1.

Preferably the atomic ratio of zinc to chromium lies in the range 10:1 to 1:1.

The invention is illustrated but not limited by the following examples:

Example 1.—Effect of water:methanol mol ratio

A zinc oxide-chromium trioxide-copper oxide catalyst was prepared by dissolving 11 grams of copper oxide in a solution of 200 grams chromium trioxide dissolved in 120 ml. water. The solution was continuously poured on to 163 grams of powdered zinc oxide, the mixture being stirred continually. The catalyst was allowed to stand overnight at room temperature, and was then dried at 120° C. for 4 hours. This catalyst was very hard, and was used directly as a granular catalyst by crushing and sieving to 6–12 mesh BSS. On analysis, the catalyst had the following composition (stable at 550° C.) Zn 24.8, Cr 33.2, Cu 2.8 percent weight. 40 ml. of catalyst were placed in a once-through continuous flow reactor and heated to 120° C. in a slow stream of nitrogen. The catalyst was activated by the passage of aqueous methanol (2:1 water: methanol mol ratio) while heating to 240° C. (1½ hours).

Table 1 shows the effect of water:methanol mol ratio on the methanol conversion and carbon monoxide content of the exit gas, with a methanol space velocity of 1 v./v./hr. and at atmospheric pressure.

TABLE 1

| Block Temperature, °C. | Catalyst Temperature, °C. | Water:Methanol mol ratio | Percent Methanol Conversion | Exit Gas Analysis | | | | Percent Shift Reaction $\frac{CO_2}{CO+CO_2}$ |
|---|---|---|---|---|---|---|---|---|
| | | | | $H_2$ | CO | $CO_2$ | $CH_4$ | |
| 335 | 300 | 2:1 | 97 | 76.3 | 0.8 | 22.9 | <0.1 | 96.7 |
| 335 | 298 | 1.1:1 | 91 | 76.2 | 1.9 | 21.9 | <0.1 | 92.0 |
| 350 | 313 | 1.1:1 | 97 | 74.9 | 4.1 | 21.0 | <0.1 | 83.7 |
| 347 | 312 | 2:1 | 91 | 75.4 | 1.1 | 23.5 | <0.1 | 95.6 |

Table 1 shows that the water:methanol mol ratio has little effect on the methanol conversion, and that low carbon monoxide contents are obtained with the 2:1 water:methanol mol ratio, particularly at the higher temperature of 350° C.

Example 2.—Effect of catalyst composition

Catalysts were made by reacting basic copper carbonate with chromium trioxide in aqueous solution, and pouring the resultant mixture continuously, with stirring, on to zinc oxide. The catalysts were allowed to stand for half an hour at room temperature, and were dried for 2 hours at 120° C. The powdered catalysts were pelleted with 2 percent lubricant and then crushed and sieved to the desired mesh size, followed by calcining in air at 250° C. to remove the lubricant.

Table 2 shows results obtained with varying catalyst composition, under the following conditions:

Water:methanol mol ratio _____ 2:1
Methanol space velocity, v./v./hr. _____ 1
Block temperature, °C. _____ 240
Pressure _____ Atmospheric
Catalyst volume, ml. _____ 40

TABLE 2

| Catalyst Composition (Metal Atomic Ratios) | Percent Methanol Conversion | Exit Gas Analysis, percent mol | | | | Percent Shift Reaction |
|---|---|---|---|---|---|---|
| | | H₂ | CO | CO₂ | CH₄ | |
| 2 Zn. 1 Cr | 1.3 | 74.4 | 0.1 | 25.5 | <0.1 | 99.7 |
| 2 Zn. 1 Cr. 0.14 Cu | 65 | 74.9 | <0.1 | 25.1 | <0.1 | >99.7 |
| 2 Zn. 1 Cr. 0.28 Cu | 74 | | | | | |
| 1 Zn. 1 Cr. 0.14 Cu | 62 | 75.1 | <0.1 | 24.9 | <0.1 | >99.7 |
| 4 Zn. 1 Cr. 2 Cu | 75 | | | | | |
| 6 Zn. 1 Cr. 1.5 Cu | 74 | | | | | |

Example 3.—Effect of pressure

A catalyst was made by the method used in Example 1. The catalyst had an atomic composition 2.5Zn:1 Cr:0.16Cu.

The effect of pressure is shown in Table 3. The results were obtained with an aqueous methanol feed of molar composition 2 water: 1 methanol, at a methanol space velocity of 1 v./v./hr.

TABLE 3

| Pressure | Block Temperature, °C. | Catalyst Temperature, °C. | Percent Methanol Conversion | Exit Gas Analysis, percent mol | | | | Percent shift Reaction CO₂/(CO+CO₂) |
|---|---|---|---|---|---|---|---|---|
| | | | | H₂ | CO | CO₂ | CH₄ | |
| Atmospheric | 296 | 264 | 90 | 75.0 | 0.5 | 24.5 | <0.1 | 98 |
| 100 p.s.i.g | 283 | 270 | 68 | 75.2 | 0.5 | 24.3 | <0.1 | 98 |
| 300 p.s.i.g | 293 | 270 | 68 | 75.5 | 0.4 | 24.2 | <0.1 | 98 |
| 300 p.s.i.g | 328 | 293 | 92 | 74.4 | 1.9 | 23.7 | <0.1 | 93 |

Increase of pressure from atmospheric to 100 p.s.i.g. at a constant block temperature of 295° C. (±20 C.) reduced the methanol conversion drastically; further increase of pressure to 300 p.s.i.g. did not affect the methanol conversion. Pressure had no effect on the shift reaction. At 300 p.s.i.g. pressure the methanol conversion could be increased to 92 percent by increasing the temperature by 35° C. but this increased the carbon monoxide content of the exit gas.

Example 4.—Effect of temperature on methanol conversion and carbon monoxide content The effect of temperature on the methanol conversion is shown in Table 4.

The catalyst used had an atomic composition of 2Zn:1Cr:0.14Cu. Conditions other than temperature were the same as in Example 2.

TABLE 4

| Block Temperature, °C. | Percent Methanol Conversion | Exit Gas Analysis, percent mol | | | | Percent Shift Reaction |
|---|---|---|---|---|---|---|
| | | H₂ | CO | CO₂ | CH₄ | |
| 240 | 61 | 76.0 | <0.1 | 24.0 | <0.1 | >99.7 |
| 280 | 92 | 76.3 | 0.4 | 23.3 | <0.1 | 98.2 |

We claim:

1. A process for the production of gaseous mixtures comprising carbon dioxide and hydrogen, from methanol, comprising: passing methanol and water in a water:methanol mol ratio lying in the range of 1:1 to 4:1 over-a-zinc-chromium-copper catalyst composition, at a pressure of from atmospheric to 100 p.s.i.g., at a temperature in the range of from 180° to 350° C. and at a liquid space velocity of methanol in the range of from 0.5 to 2.0 vol./vol./hour, and recovering the desired gaseous mixture comprising carbon dioxide and hydrogen, as a product, said catalyst composition having an atomic ratio of zinc to chromium in the range of from 10:1 to 1:1 and an atomic ratio of zinc to copper in the range of from 100:1 to 2:1 and having been prepared by slurrying a solution of chromic acid and copper ions with powdered zinc oxide and drying and calcining the slurry mixture.

2. A process according to claim 1 wherein copper metal is dissolved in the chromic acid.

3. A process according to claim 1 wherein a copper compound is dissolved in the chromic acid.

4. A process according to claim 1 wherein the liquid space velocity lies in the range 0.5–1.0 vol./vol./hour.

References Cited

UNITED STATES PATENTS 2,010,427  8/1935  Eversole _____ 23—210 X
2,425,625  8/1947  Larson _____ 23—212

OTHER REFERENCES

Bull. Chem. Soc., Japan, vol. 33, pages 358–363 (1960).

OSCAR R. VERTIZ, *Primary Examiner.*

EDWARD STERN, *Assistant Examiner.*